United States Patent
Han et al.

(10) Patent No.: US 11,110,927 B2
(45) Date of Patent: Sep. 7, 2021

(54) SYSTEM FOR CONTROLLING BRAKING ENERGY REGENERATION STEP VARIABLE AND METHOD THEREOF

(71) Applicants: Hyundai Motor Company, Seoul (KR); Kia Motors Corporation, Seoul (KR)

(72) Inventors: Soo-Lim Han, Gyeonggi-do (KR); Woo-Cheol Cho, Daejeon (KR); Seung-Jae Yoo, Gyeonggi-do (KR); Jea-Myoung Youn, Gyeonggi-do (KR); Ja-Chun Han, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 24 days.

(21) Appl. No.: 16/151,176

(22) Filed: Oct. 3, 2018

(65) Prior Publication Data

US 2019/0176827 A1    Jun. 13, 2019

(30) Foreign Application Priority Data

Dec. 8, 2017    (KR) .................. 10-2017-0168535

(51) Int. Cl.
*B60W 30/00*        (2006.01)
*B60W 30/18*        (2012.01)
(Continued)

(52) U.S. Cl.
CPC ......... *B60W 30/18127* (2013.01); *B60L 7/18* (2013.01); *B60L 15/2009* (2013.01);
(Continued)

(58) Field of Classification Search
CPC ... B60W 30/18127; B60W 10/18; B60L 7/18; B60L 15/2009; B60L 15/2018;
(Continued)

(56) References Cited

U.S. PATENT DOCUMENTS

2009/0198406 A1*  8/2009  Brown .................. B60T 17/221
                                                   701/29.1
2013/0066493 A1*  3/2013  Martin .................. B60W 20/00
                                                   701/22
(Continued)

*Primary Examiner* — Thomas E Worden
*Assistant Examiner* — Tiffany P Ohman
(74) *Attorney, Agent, or Firm* — Mintz Levin Cohn Ferris Glovsky and Popeo, P.C.; Peter F. Corless

(57) ABSTRACT

A system variably controls braking energy regeneration in a vehicle by reflecting a compensation torque depending on a difference in deceleration based on a road gradient when the vehicle travels over a downhill section or an uphill section of a road. The system includes a longitudinal sensor to receive the road gradient and compare the road gradient to a specific grade, and then compensate for the road gradient using a grade resistance value and a deceleration based value depending on a difference between deceleration manually set by a driver using a paddle shift and an actual vehicle deceleration. The system may include a controller to output a coasting torque as a correction torque that is a sum of the grade resistance value and the deceleration based value.

5 Claims, 4 Drawing Sheets

(51) Int. Cl.
*B60W 10/18* (2012.01)
*B60L 15/20* (2006.01)
*F16K 31/04* (2006.01)
*B60L 7/18* (2006.01)

(52) U.S. Cl.
CPC ......... *B60L 15/2018* (2013.01); *B60W 10/18* (2013.01); *F16K 31/041* (2013.01); *B60L 2240/12* (2013.01); *B60L 2240/16* (2013.01); *B60L 2240/423* (2013.01); *B60L 2240/642* (2013.01); *B60L 2250/16* (2013.01); *B60L 2260/24* (2013.01)

(58) Field of Classification Search
CPC ............. B60L 2240/12; B60L 2240/16; B60L 2240/423; B60L 2240/642; B60L 2250/16; B60L 2260/24; F16K 31/041
USPC .......................................................... 701/70
See application file for complete search history.

(56) References Cited

U.S. PATENT DOCUMENTS

2018/0135744 A1* 5/2018 Kuang ................ F16H 61/0213
2019/0291591 A1* 9/2019 Suzuki .................... B60L 15/20

* cited by examiner

SYSTEM FOR CONTROLLING BRAKING ENERGY REGENERATION STEP VARIABLE AND METHOD THEREOF

CROSS-REFERENCE TO RELATED APPLICATION(S)

This application claims under 35 U.S.C. § 119(a) the benefit of Korean Patent Application No. 10-2017-0168535, filed on Dec. 8, 2017, the entire contents of which are incorporated by reference herein.

BACKGROUND

(a) Technical Field

Exemplary embodiments of the present disclosure relate to a regenerative braking technique in a vehicle including a drive motor and an electric storage device, and more particularly, to a system for controlling a braking energy regeneration step variably depending on a road gradient and a method thereof.

(b) Description of the Related Art

Braking in a vehicle including a drive motor and an electric storage device includes brake hydraulic braking and regenerative braking by a motor.

Recently, a paddle shift that may manually set a regeneration step for efficient regenerative braking has been applied to a vehicle. A driver adjusts the desired regeneration step through an [+] input or a [-] input of the paddle shift upon coasting to adjust a deceleration by the regenerative braking. FIG. 1 (RELATED ART) is a view showing a regenerative torque depending on a vehicle speed for each regeneration step which is set by the paddle shift, and shows a difference in the regenerative torque depending on the regeneration step of four stages D0, D1, D2, and D3 which are set by the paddle shift.

However, if the regeneration step is adjusted depending only on the manual operation of the driver, there is an inconvenience that the driver frequently performs paddle shift input, acceleration and braking operations depending on the driving conditions such as the change in the road gradient. Therefore, the regenerative braking may not be performed efficiently, such that the expected fuel efficiency cannot be achieved.

SUMMARY

An embodiment of the present disclosure is directed to a system for controlling braking energy regeneration step variably and a method thereof, in which driving conditions depending on a road gradient are determined along with a paddle shift manual input of a driver to control a regeneration step variably to thereby minimize unnecessary paddle shift input, acceleration, and braking operations, thereby improving driving convenience and fuel efficiency on a real road.

Other objects and advantages of the present disclosure can be understood by the following description, and become apparent with reference to the embodiments of the present disclosure. Also, it would be apparent to those skilled in the art to which the present disclosure pertains that the objects and advantages of the present disclosure can be realized by the arrangement as described herein and combinations thereof.

In accordance with an embodiment of the present disclosure, a system for variably controlling braking energy regeneration in a vehicle can include: an operation condition determiner configured to determine whether the vehicle is coasting and output gradient information based on a road gradient; a grade resistance based feed forward (FF) controller configured to receive the gradient information from the operation condition determiner and calculate a grade resistance torque as an FF control value; a deceleration based feedback (FB) controller configured to output an FB control value based on a difference between a difference between deceleration manually set by a driver using a paddle shift and an actual vehicle deceleration; and a coasting torque reflector configured to output a coasting torque including a correction torque calculated as a sum of the FF control value and the FB control value.

The operation condition determiner may determine whether a vehicle is coasting based on information on an accelerator position sensor (APS), a brake, and a gear stage and determine whether a road gradient is equal to or greater than a specific grade based on gradient information measured by a longitudinal acceleration sensor to finally determine that an operation condition of a regeneration step variable control is satisfied if the road gradient is greater than or equal to a specific grade during the coasting.

The operation condition determiner may provide the gradient information to the grade resistance based FF controller when the regeneration step variable control operation condition is satisfied.

The grade resistance based FF controller may use the gradient information to calculate a grade resistance torque and output the calculated grade resistance torque as an FF control value.

The deceleration based FB controller may output a feedback (FB) control value for feedback compensating for the difference between the deceleration depending on the regeneration step manually set by the driver and an actual vehicle deceleration by a PID control.

The coasting torque reflector may reflect a compensation torque calculated by a sum of the FF control value and the FB control value to the regenerative torque depending on the regeneration step manually set by the driver to output the coasting torque.

The system may further include: a regeneration step display inversely calculating the regeneration step having the regenerative torque approximating the sum of the regenerative torque depending on the regeneration step manually set by the driver and the grade resistance torque calculated by the grade resistance based FF controller so that the driver recognizes the regeneration step actually performed during the coasting and displaying the inversely calculated regeneration step.

In accordance with another embodiment of the present disclosure, a method for variably controlling braking energy regeneration step in a vehicle can include: determining, by an operation condition determiner, whether the vehicle is coasting and output gradient information based on a road gradient; receiving, by a grade resistance based feed forward (FF) controller, the gradient information from the operation condition determiner and calculating a grade resistance torque as an FF control value; outputting, by a deceleration based feedback (FB) controller, an FB control value based on a difference between a difference between deceleration manually set by a driver using a paddle shift and an actual vehicle deceleration; and outputting, by a coasting torque reflector, a coasting torque including a correction torque calculated as a sum of the FF control value and the FB control value.

In the determining of the operation condition, the operation condition determiner may determine whether or not the operation condition of the regeneration step variable control is satisfied.

In the outputting of the grade resistance based FF control value, the grade resistance based FF controller may calculate the grade resistance torque and output the calculated grade resistance torque as the FF control value.

In the outputting of the deceleration based FB control value, the deceleration based FB controller may output the FB control value for feedback compensating for the difference between the deceleration depending on the regeneration step manually set by the driver and the actual vehicle deceleration by the PID control.

In the reflecting of the coasting torque, the coasting torque reflector may reflect the compensation torque calculated by the sum of the FF control value and the FB control value to the regenerative torque depending on the regeneration step manually set by the driver to output the coasting torque.

The method may further include displaying a regeneration step in which a regeneration step display inversely calculates a regeneration step having a regenerative torque approximating a sum of the regenerative torque depending on the regeneration step manually set by the driver and the grade resistance torque calculated by the grade resistance based FF controller and displays the inversely calculated regeneration step.

DESCRIPTION OF SPECIFIC EMBODIMENTS

Figure 1:
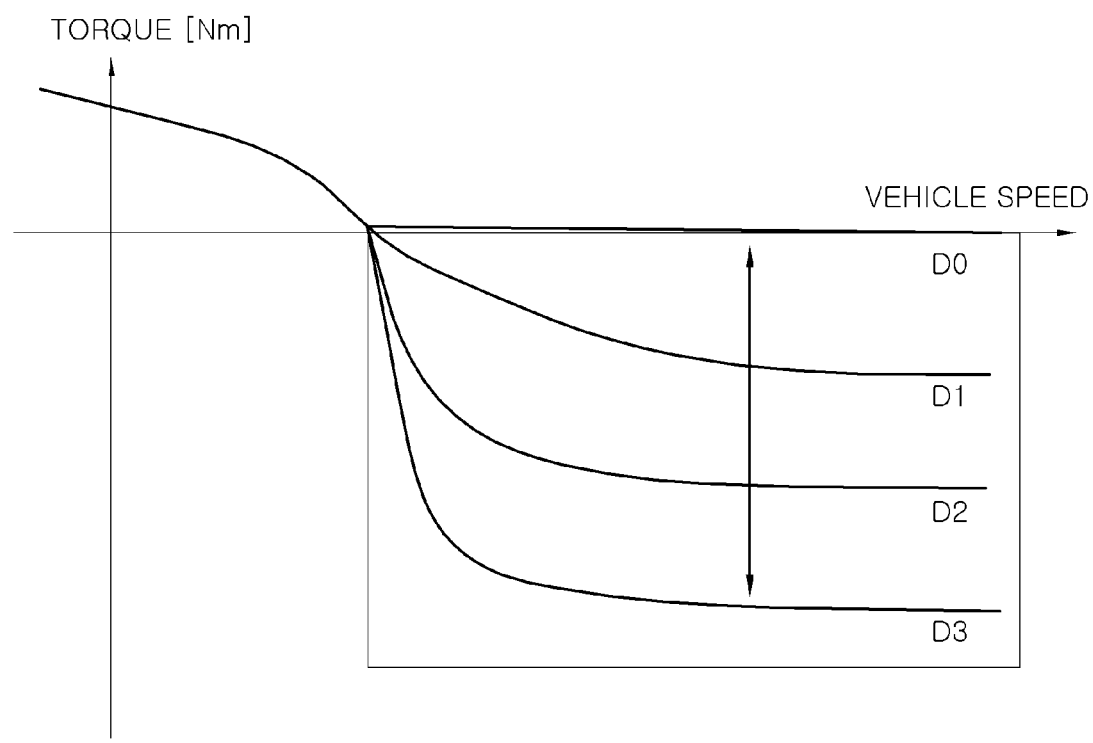
FIG. 1 (RELATED ART) is a diagram showing a regenerative torque depending on a vehicle speed for each regeneration step which is set by a paddle shift.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a system for controlling braking energy regeneration step variably and a control method thereof according to an embodiment of the present disclosure will be described in detail with reference to the accompanying drawings. However, a detailed description and a detailed description for well-known functions and configurations that may obscure the gist of the present disclosure will be omitted.

Figure 2:
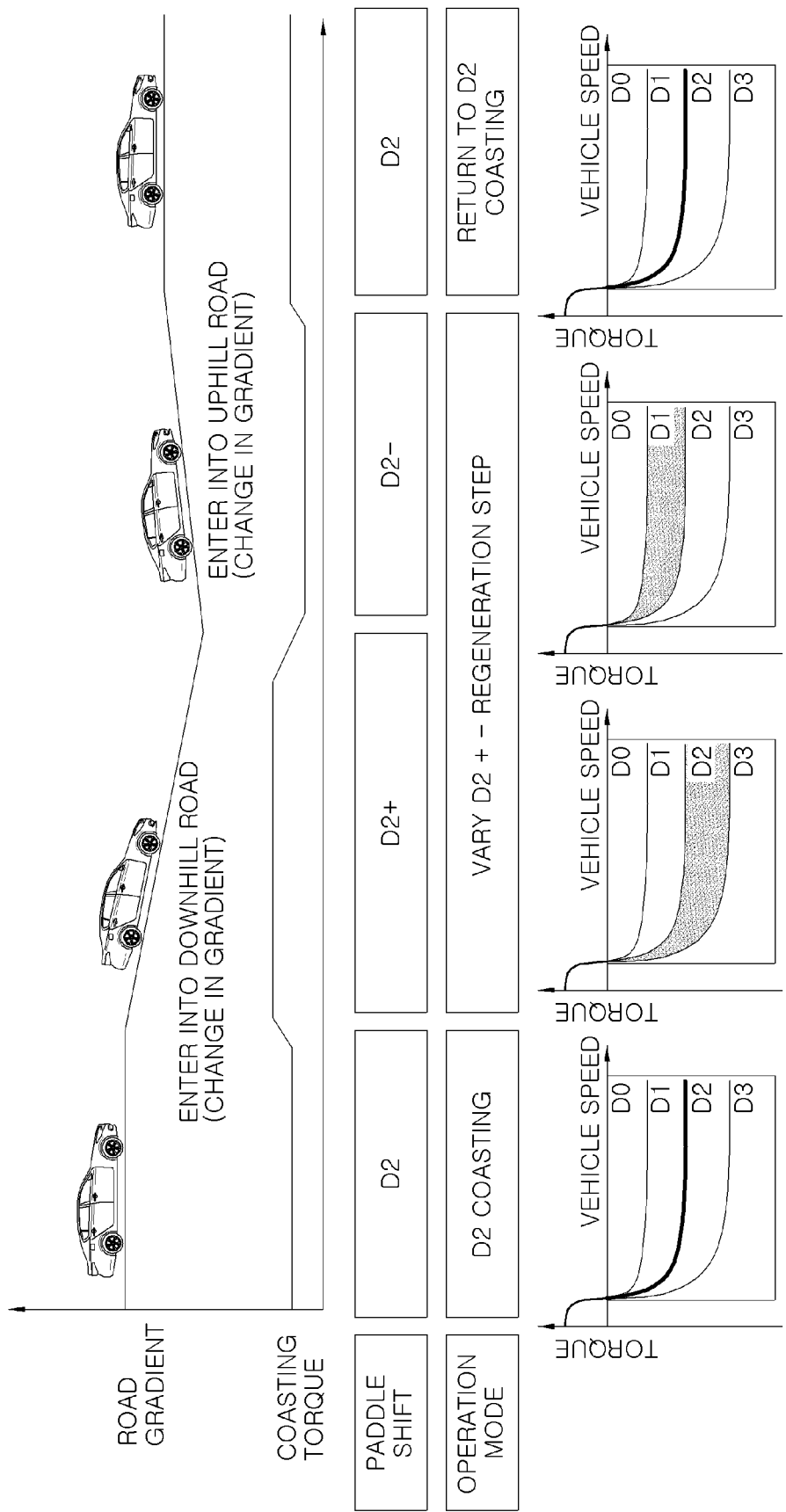
FIG. 2 is a diagram showing a basic concept of the present disclosure.

FIG. 2 is a diagram showing a basic concept of the present disclosure.

Referring to FIG. 2, the present disclosure has a basic concept that if a difference in deceleration depending on a road gradient occurs due to the entry of a vehicle into a downhill road or an uphill road while the vehicle is coasting on a flatland at a defined deceleration depending on a regeneration step manually set by a driver, the regeneration step is variably controlled by reflecting a compensation torque depending on the difference in deceleration to continuously keep the driver the desired deceleration regardless of the road gradient during the regenerative braking without the driver performing paddle shift input, acceleration, and braking operations.

Figure 3:
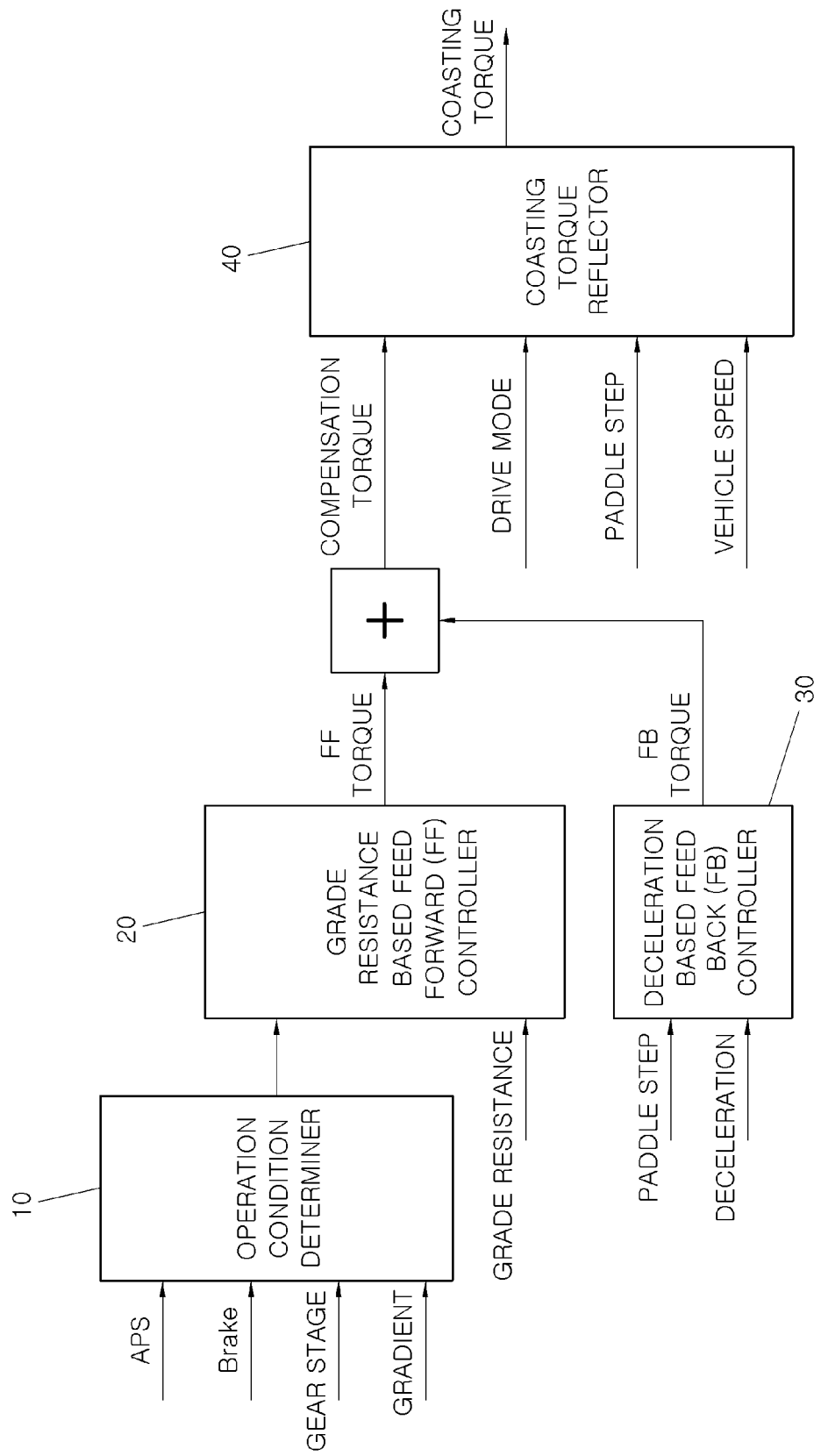
FIG. 3 is a configuration diagram of a system for controlling braking energy regeneration step variably according to an embodiment of the present disclosure.

FIG. 3 is a configuration diagram of a system for controlling braking energy regeneration step variably according to an embodiment of the present disclosure.

Referring to FIG. 3, the system for controlling braking energy regeneration step variably according to the embodiment of the present disclosure is configured to include an operation condition determiner 10, a grade resistance based feed forward (FF) controller 20, a deceleration based feed back (FB) controller 30, and a casting torque reflector 40.

The operation condition determiner 10 determines whether a vehicle is coasting based on information on an accelerator position sensor (APS), a brake, and a gear stage and determines whether the road gradient is equal to or greater than a specific grade based on gradient information measured by a longitudinal acceleration sensor. If the road gradient is greater than or equal to a specific grade during the coasting, the operation condition determiner 10 finally determines that the operation condition of the regeneration step variable control is satisfied and provides the gradient information to the grade resistance based FF controller 20. The specific grade may be set to an gradient (θ=tan⁻¹ (0.05)) corresponding to 5% based on a tangent value with respect to an inclination angle of 45°, for example The grade resistance based FF controller 20 uses the gradient information to calculate a grade resistance torque as the following Equation 1 and outputs the calculated grade resistance torque as an FF control value.

$$\text{Grade resistance torque} = (mg \sin \theta) \times r \times k \quad \text{(Equation 1)}.$$

In the above Equation 1, m represents an empty vehicle weight of a vehicle, g represents a gravitational acceleration, θ represents a road inclination angle, r represents a tire dynamic radius, and k represents a compensating factor for reflecting other resistance elements.

The deceleration based FB controller 30 outputs an FB control value for feedback-compensating a difference between the deceleration depending on the regeneration step manually set by the driver and the actual vehicle deceleration by a proportional integral derivative (PID) control. Accordingly, the deceleration based FB controller 30 compensates for the vehicle deceleration error caused by the weight error of the vehicle and the road surface condition based on the FF control value output from the grade resistance based FF controller 20.

The coasting torque reflector 40 outputs a coasting torque by reflecting a correction torque calculated as a sum of the FF control value and the FB control value to a regenerative torque depending on the regeneration step manually set by the driver.

Meanwhile, the system for controlling braking energy regeneration step variably according to the embodiment of the present disclosure may further include a regeneration step display (not illustrated) which inversely calculates the regeneration step having a regenerative torque approximating the sum of the regenerative torque depending on the regeneration step manually set by the driver and the grade resistance torque calculated by the grade resistance based FF controller 20 so that the driver may recognize the regeneration step actually performed during the coasting and displays the inversely calculated regeneration step (e.g. on an instrument panel).

Figure 4:
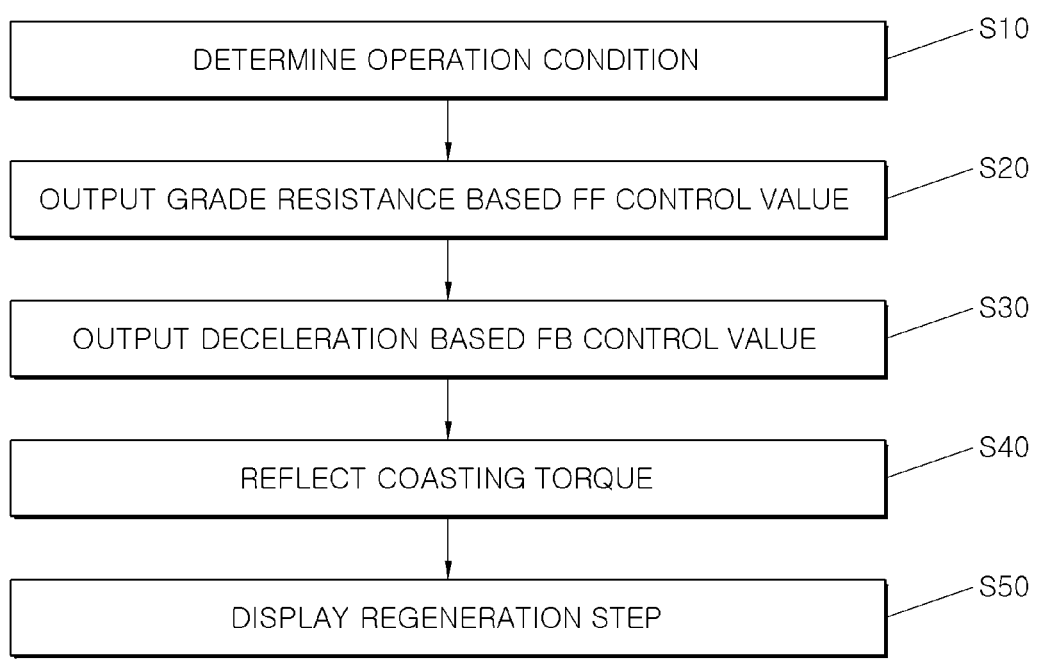
FIG. 4 is a configuration diagram of a method for controlling braking energy regeneration step variably according to an embodiment of the present disclosure.

FIG. 4 is a configuration diagram of a method for controlling braking energy regeneration step variably according to an embodiment of the present disclosure.

Referring to FIG. 4, the method for controlling braking energy regeneration step variably according to the embodiment of the present disclosure includes determining an operation condition (S10), outputting a grade resistance based FF control value (S20), outputting a deceleration based FB control value (S30), reflecting a coasting torque (S40), and displaying a regeneration step (S50).

In the determining of the operation condition (S10), the operation condition determiner 10 determines whether or not the operation condition of the regeneration step variable control is satisfied.

In the outputting of the grade resistance based FF control value (S20), the grade resistance based FF controller 20 calculates the grade resistance torque and outputs the calculated grade resistance torque as the FF control value.

In the outputting of the deceleration based FB control value (S30), the deceleration based FB controller 30 outputs the FB control value for feedback compensating for the difference between the deceleration depending on the regeneration step manually set by the driver and the actual vehicle deceleration by the PID control.

In the reflecting of the coasting torque (S40), the coasting torque reflector 40 reflects the compensation torque calculated by the sum of the FF control value and the FB control value to the regenerative torque depending on the regeneration step manually set by the driver to output the coasting torque.

In the displaying of the regeneration step (S50), the regeneration step display (not illustrated) inversely calculates the regeneration step having the regenerative torque approximating the sum of the regenerative torque depending on the regeneration step manually set by the driver and the grade resistance torque calculated by the grade resistance based FF controller 20 and displays the inversely calculated regeneration step (e.g. on the instrument panel).

The system for controlling braking energy regeneration step variably and a method thereof according to the embodiment the present disclosure determines the driving conditions depending on the road gradient along with the paddle shift manual input of the driver to control the regeneration step variably to minimize the unnecessary paddle shift input, acceleration, and braking operations, thereby improving the driving convenience and the fuel efficiency on the real road.

The system for controlling braking energy regeneration step variably and method thereof according to the embodiment of the present disclosure can determine the driving conditions depending on the road gradient along with the paddle shift manual input of the driver to control the regeneration step variably, to thereby minimize the unnecessary paddle shift input, acceleration, and braking operations, thereby improving the driving convenience and the fuel efficiency on a real road.

The embodiments disclosed in the present specification and the accompanying drawings are only used for the purpose of easily explaining the technical idea of the present disclosure and are not used to limit the scope of the present disclosure described in claims. Therefore, it will be appreciated to those skilled in the art that various modifications are made and other equivalent embodiments are available.

What is claimed is:

1. A system for variably controlling braking energy regeneration in a vehicle, comprising:
    a longitudinal acceleration sensor configured to measure a road gradient of a road on which the vehicle is traveling;
    an operation condition controller determines whether the vehicle is coasting and receives the measured road gradient from the longitudinal acceleration sensor, compares the measured road gradient with a predetermined specific grade to determine whether the measured road gradient is greater than or equal to the specific grade, wherein when the measured road gradient is greater than or equal to the specific grade, the operation condition controller outputs gradient information based on the measured road gradient to a grade resistance feed forward (FF) controller;
    the FF controller receives the gradient information from the operation condition controller and calculates a grade resistance torque as a FF control value;
    a deceleration based feedback (FB) controller outputs a FB control value based on a difference between deceleration manually set by a driver of the vehicle using a paddle shift and an actual vehicle deceleration; and
    a coasting torque controller, wherein the coasting torque controller applies a coasting torque to a regenerative torque depending on a regeneration step set manually by the driver, the coasting torque including a compensation torque calculated as a sum of the FF control value and the FB control value.

2. The system of claim 1, wherein the operation condition controller determining whether the vehicle is coasting is based on information from an accelerator position sensor (APS), a brake, and a gear stage, determines whether the road gradient is equal to or greater than the specific grade based on the road gradient measured by the longitudinal acceleration sensor, and determines that an operation condition of a regeneration step variable control is satisfied when the road gradient is greater than or equal to the specific grade.

3. The system of claim 1, further comprising:
a regeneration step display inversely calculating the regeneration step having the regenerative torque approximating the sum of the regenerative torque depending on the regeneration step manually set by the driver and the grade resistance torque calculated by the grade resistance based FF controller so that the driver recognizes the regeneration step actually performed during the coasting and displaying the inversely calculated regeneration step.

4. A method for variably controlling braking energy regeneration in a vehicle, the method comprising:
measuring, by a longitudinal acceleration sensor, a road gradient of a road on which the vehicle is traveling;
determining, by an operation condition controller, whether the vehicle is coasting;
receiving, by the operation condition controller, the measured road gradient from the longitudinal acceleration sensor, comparing the measured road gradient with a predetermined specific grade to determine whether the measured road gradient is greater than or equal to the specific grade, wherein when the measured road gradient is greater than or equal to the specific grade, the operation condition controller outputs gradient information based on the measured road gradient to a grade resistance feed forward (FF) controller;
receiving, by the FF controller, the gradient information from the operation condition controller and calculating a grade resistance torque as a FF control value;
outputting, by a deceleration based feedback (FB) controller, a FB control value based on a difference between deceleration manually set by a driver of the vehicle using a paddle shift and an actual vehicle deceleration; and
applying, by a coasting torque controller, a coasting torque to a regenerative torque depending on a regeneration step set manually by the driver, the coasting torque including a compensation torque calculated as a sum of the FF control value and the FB control value.

5. The method of claim 4, further comprising:
displaying the regeneration step in which a regeneration step display inversely calculates the regeneration step having the regenerative torque approximating a sum of the regenerative torque depending on the regeneration step manually set by the driver and the grade resistance torque calculated by the grade resistance based FF controller and displays the inversely calculated regeneration step.

* * * * *